(12) United States Patent
Battisti

(10) Patent No.: US 6,964,150 B2
(45) Date of Patent: Nov. 15, 2005

(54) APPARATUS FOR SUPPLYING ARTICLES TO A TRANSFERRING LINE, IN PARTICULAR FOR FEEDING A CONTAINER FILLING MACHINE

(75) Inventor: Antonio Battisti, Latina (IT)

(73) Assignee: Packservice, S.R.L., Latina (IT)

( * ) Notice: Subject to any disclaimer, the term of this patent is extended or adjusted under 35 U.S.C. 154(b) by 0 days.

(21) Appl. No.: 10/783,468

(22) Filed: Feb. 20, 2004

(65) Prior Publication Data

US 2004/0163363 A1 Aug. 26, 2004

(30) Foreign Application Priority Data

Feb. 20, 2003 (IT) ............ BO2003A0075

(51) Int. Cl.⁷ ............ B65B 35/38; B65B 5/06
(52) U.S. Cl. ............ 53/541; 53/252; 198/468.3
(58) Field of Search ............ 53/153, 539, 540, 53/247, 541, 252, 447; 198/468.3, 468.6

(56) References Cited

U.S. PATENT DOCUMENTS

| | | | |
|---|---|---|---|
| 3,603,462 A * | 9/1971 | Moser | 414/788.8 |
| 3,908,539 A * | 9/1975 | O'Brien | 100/49 |
| 4,034,846 A * | 7/1977 | Burgis et al. | 414/788.9 |
| 4,520,614 A * | 6/1985 | Aykut et al. | 53/540 |
| 4,788,812 A * | 12/1988 | Morita et al. | 53/447 |
| 4,902,184 A * | 2/1990 | Fritz | 414/790.3 |
| 4,939,891 A * | 7/1990 | Podini | 53/496 |
| 5,116,195 A * | 5/1992 | Pattarozzi | 414/790.3 |
| 5,279,096 A * | 1/1994 | Mims | 53/447 |
| 5,431,530 A * | 7/1995 | Kobayashi et al. | 414/794.4 |
| 5,495,700 A * | 3/1996 | Stauber et al. | 53/118 |
| 5,605,433 A * | 2/1997 | Tanaka | 414/793.4 |
| 6,574,943 B2 * | 6/2003 | Van Dam | 53/447 |
| 6,787,096 B2 * | 9/2004 | Boscaratto et al. | 264/535 |

FOREIGN PATENT DOCUMENTS

DE 25 23 242 A 12/1975

* cited by examiner

Primary Examiner—Stephen F. Gerrity
Assistant Examiner—Paul Durand
(74) Attorney, Agent, or Firm—William J. Sapone; R. Neil Sudol; Henry D. Coleman

(57) ABSTRACT

In an apparatus for feeding articles to a transferring line leading to a container filling machine, a conveyor moves a plurality of articles to an inlet section of the apparatus, where a plate moves vertically from the inlet section to an outlet section of the apparatus, where the articles are to be released. A plurality of collecting magazines are placed at the outlet section for receiving and piling the articles and then a pusher moves the articles situated in a pile in each collecting magazine to a related box of a box transferring line.

25 Claims, 2 Drawing Sheets

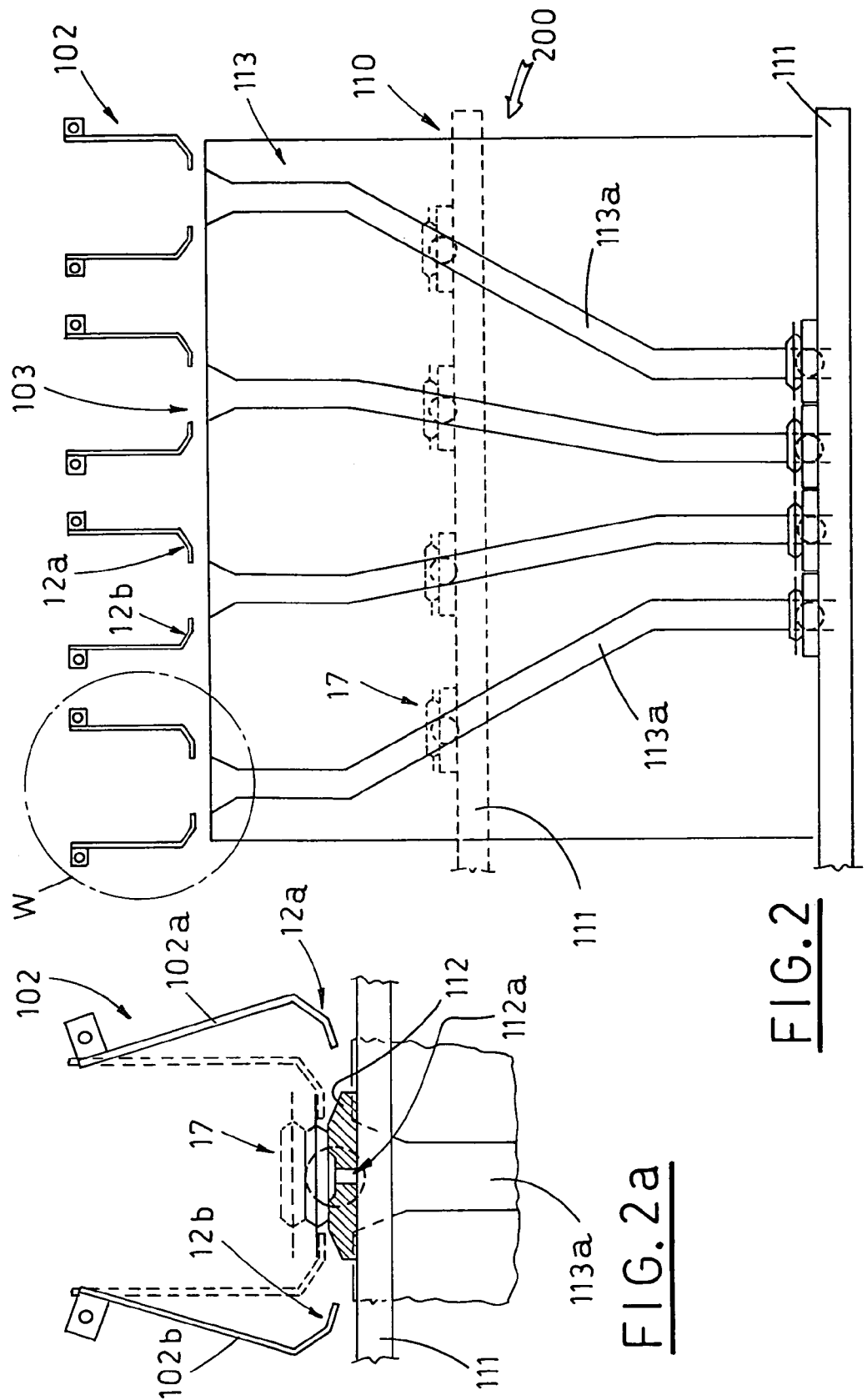

APPARATUS FOR SUPPLYING ARTICLES TO A TRANSFERRING LINE, IN PARTICULAR FOR FEEDING A CONTAINER FILLING MACHINE

FIELD OF THE INVENTION

The present invention relates to automatic packaging of articles, in particular tablets, pills, capsules and the like.

In this particular case, the present invention relates to an apparatus for supplying articles to a transferring line, in particular for feeding a container filling machine.

BACKGROUND OF THE INVENTION

Known packaging machines are aimed at packing articles such as tablets, pills, capsules and the like, in the so-called strip packages or also in the well known blister packages.

The strip packages and the blister pack are then inserted into the boxes of a box-conveyor leading to a machine for placing the blister packs of the strip packages into containers.

In particular, the outlet section of the machine for producing the blister packs or the strip packages releases the products onto a belt conveyors, situated nearby. The packages, coming out of a shearing station, are placed on the conveyor arranged in side by side rows.

Once the strip packages have been released on the belt conveyor, piles of them must be formed. The piles, including two or more strip packages, are then passed to a box-conveyor leading to the container filling machine which introduces the piles into the containers.

When the piles of articles are being introduced into the boxes of the box-conveyor, they must be set at mutual crosswise distances matching the distances of the boxes. This requires another operation to set the piles of articles, or the articles before piling, at the correct distance.

These operations are usually performed by separated devices.

Therefore, the main disadvantage of the known packaging machines results from the fact that complicated and expensive additional devices or machines must be placed in cascade with the strip packages producing machine, for feeding the transferring line of a container filling machine.

SUMMARY OF THE INVENTION

The object of the present invention is to propose an unique apparatus, which is capable of feeding the transferring line to the container filling machine with piles of articles, in particular by piling and setting them at a mutual distances matching the mutual distances between the boxes of the transferring line.

Another object of the present invention is to propose an apparatus, which is extremely functional and reliable.

A further object of the present invention is to propose an apparatus, which is particularly cheap and which ensures high reliability and production performances in any operation condition, and which can be connected in extremely quick-way to the outlet sections of any kind of packaging machine.

A still further object of the present invention is to propose a particularly compact apparatus, which ensures particularly simple and easy installation and maintenance thereof.

The above mentioned objects are obtained, in accordance with the contents of the claims, by an apparatus for feeding articles to a transferring line, this transferring line in particular feeding a container filling machine, the apparatus including:

means for conveying a plurality of articles to an inlet section of said apparatus;

a plurality of working means, set, with an initial configuration with predetermined mutual distances, at said inlet section for receiving said articles from said conveying means, and operated after receiving said articles, to move vertically from said inlet section to an outlet section of said apparatus, where said articles are released, and then to move back to said inlet section;

a plurality of collecting magazines, situated at said outlet section for receiving said articles and for supporting said articles to define corresponding piles of articles;

guide means, cooperating with said plurality of working means for changing said predetermined mutual distances between said plurality of working means during the transition from said inlet section to said outlet section, in which the distances between said plurality of working means are set to match distances between said collecting magazines, and for resetting said plurality of working means to said initial configuration during a transition back to said inlet section;

pushing means, situated at said outlet section and operated when said piles, situated inside each of said collecting magazines, are completed to convey said piles of articles to boxes made in a transferring line.

BRIEF DESCRIPTION OF THE DRAWINGS

The characteristic features of the invention will be pointed out in the following description of some preferred embodiments, with reference to the enclosed drawings, in which:

FIG. 2 is a schematic, enlarged, front view of the upper area of the apparatus shown in FIG. 1;

FIG. 2a is a schematic, further enlarged view of the detail W shown in FIG. 2.

DISCLOSURE OF THE PREFERRED EMBODIMENTS

Figure 1:
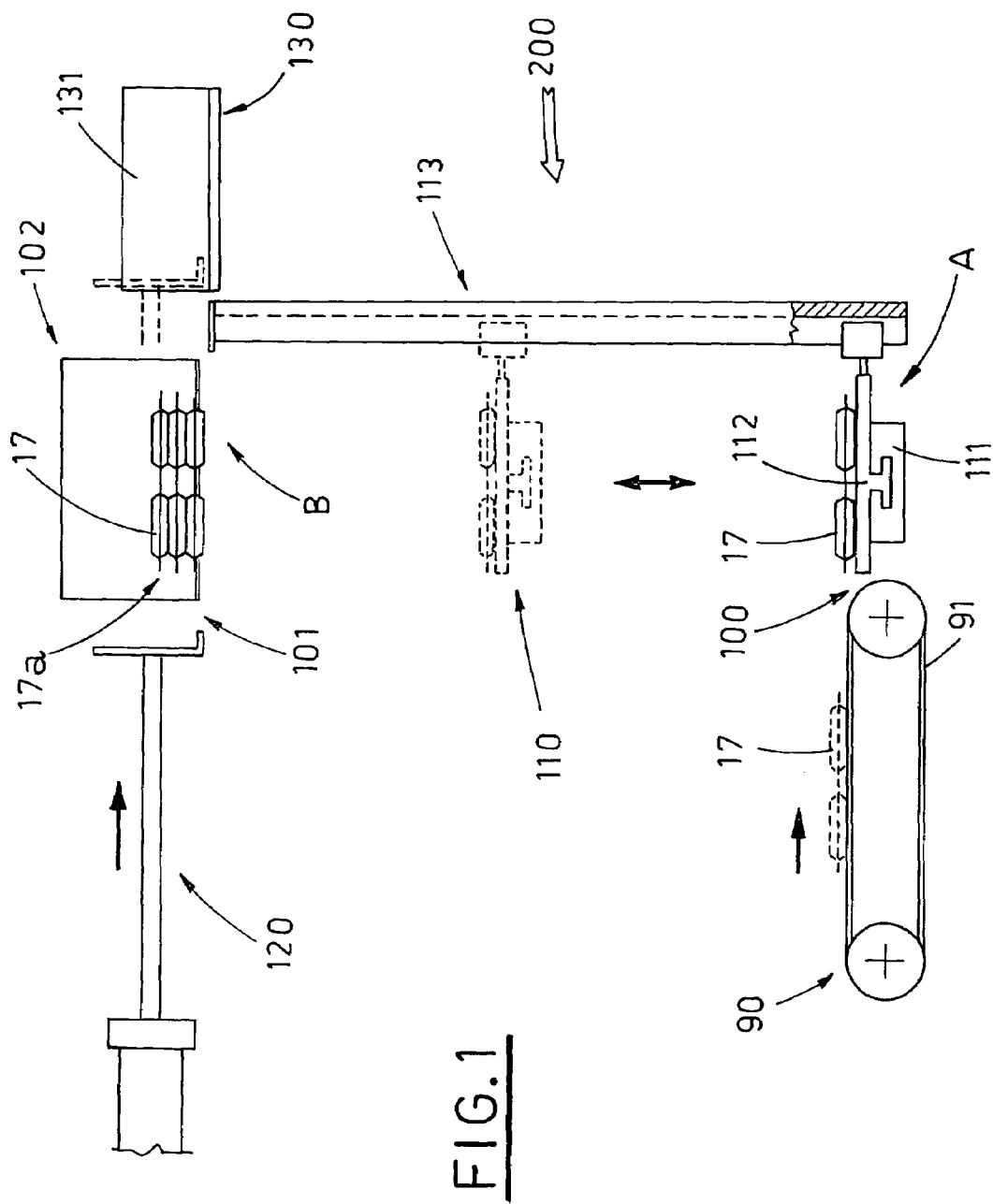
FIG. 1 is a schematic, lateral view of the proposed apparatus showing some particularly significant operation steps.

With reference to the above described drawings, the general reference 200 indicates an apparatus for feeding articles 17 (for example, tablets, pills, capsules, or strip packages, etc.) to a transferring line 130, in particular for feeding a container filling machine.

The apparatus 200 includes means 90 for conveying the articles 17 to an inlet section 100, where working means 110 receive the articles carried by the conveying means 90, which will be better described in the following.

The working means 110 are normally located in an initial configuration at an inlet position A, at the same level of the conveying means. After receiving the articles 17, they move vertically so as to reach an outlet position B, corresponding to an outlet section 101, in which they are coplanar with a transferring line 130 (FIG. 1) and where they are to leave the articles, as better described in the following.

According to the embodiment shown by way of example in the enclosed Figures, the inlet section 100 is located at a lower lever with respect to the outlet section 101. However, the apparatus 200 would operate in the same way, if the inlet section 100 were located at a level higher than the outlet section 101. Moreover, the apparatus 200 includes a plurality of collecting magazines 102, situated in the outlet section 101 and aimed at receiving articles 17 carried by the working means 110, so as to form define corresponding piles 17a of articles 17 inside the magazines.

With reference to FIG. 1, the working means 110 include, for example, a transversal plate 111, operated when they have received the articles from the conveying means 90 by vertical driving means (not shown as they are of a type well known to those skilled in the art), so as to movie between the inlet configuration A and the outlet configuration B, and vice-versa when the articles have been removed therefrom.

A plurality of longitudinal plates 112 are supported by the transversal plate 111, for receiving thereon the articles 17 carried by the conveying means 90. The longitudinal plates are mounted onto the transversal plate in a way such that they can slide therealong, so as to get nearer or farther from one another. For instance, the longitudinal plates are guided along the transversal plate by means of dove-tail guides, or similar ones.

Guide means 113 are linked to each one of the longitudinal plates 112 so as to move them horizontally during the vertical displacement of the transversal plate 111.

The guide means extend, for instance, in diverging directions, so that the longitudinal plates are spaced apart while the transversal plate is raised. This widening motion has the task of setting the longitudinal plates, and therefore also the articles placed thereon, at mutual distances, which match the distances between the collecting magazines 102 at the outlet section 101 (see FIG. 2).

The guiding means 113 may include, for example, a plurality of linear cam grooves 113a, inside which a corresponding number of barrels slide, which are connected to the longitudinal plates by means of stems.

Gripping means 112a are connected to each longitudinal plate 112 and are operated during movement of the transversal plate 111 to keep firmly the articles 17 carried by the relative longitudinal plates 112. For instance, holes connected to a source of vacuum are made in each plate 112.

Also the distances between the collecting magazines 102 can be advantageously changed and its value is substantially equal to the corresponding distance between the calibrated boxes 131 made in the transferring line 130.

Pushing means 120, for instance reciprocating pushing means, are situated in the outlet section 101 and are operated when the piles 17a of articles are completed to convey the piles 17a of articles 17, situated in each collecting magazine 102, to the calibrated boxes 131 made in the transferring line 130 for feeding the container filling machine. Endless pushing means may be used as well.

After the piles of articles have been removed from the collecting magazines 102, new piles are begun.

With reference to FIG. 2a, each collecting magazine 102 includes, for example, lateral walls 102a, 102b, whose lower parts have the respective edges 12a, 12b folded so as to extend toward each other. The lateral walls 102a, 102b are hinged at top so that they can swing to widen and then restrict the inlet opening delimited by the folded edges, operated by power means, which are not shown as they are known to those skilled in the art. When the transverse plate 111 with the longitudinal plates 112 and the articles 17, is about to arrive at the outlet section 101, the lateral walls are swung to open, so that the articles 17 can be positioned between the walls from the bottom.

When the articles 17 have been introduced, the lateral walls 102a, 102b are closed, thus making the relative horizontal folded edges 12a, 12b hold the piles 17a of articles 17 present inside the collecting magazines 102. Then the transverse plate 111 and the longitudinal plates 112 are moved back to inlet position A According to another embodiment, not shown, each collecting magazine 102 includes stationary lateral walls 102a, 102b, and elastic yielding members, which are situated at the open bottom 103. The elastic members, when forced, allow passage of the articles 17 carried by the longitudinal plates 112, so as to define the piles 17a of articles 17 and holding the piles 17a between the lateral walls 102a, 102b.

By way of example, the conveying means 90 include at least one conveying belt 91, which moves a plurality of articles 17 to the inlet section 100, to feed the longitudinal plates 112 dwelling at the inlet position A. Preferably, the conveying belt 91 is an endless belt mounted on a driving pulley and a driven pulley.

According to an advantageous embodiment, the conveying means 90 include a plurality of belt conveyors 91, arranged side by side, each of which is aimed at feeding a corresponding longitudinal plate 112.

The proposed apparatus 200 feeds articles 17 to a transferring line 130, which is arranged angularly with respect to the conveying means 90.

Actually, in relation to the machine layout, the transferring line 130 can be oriented longitudinally (in alignment configuration) or transversally (90° configuration) with respect to the conveying means 90.

The proposed apparatus 200 allows the articles 17 (for example tablets, capsules, pills, strip packages) to be placed with a controlled configuration, in particular, into relative calibrated boxes 131 made in the transferring line 130, independently from the arrangement of the latter (in line or at 90°), thus allowing direct feeding of a container filling machine, without necessity of interposing any expensive apparatus.

By adjusting the extension of the vertical motion of the longitudinal plates 112, the apparatus 200 is set to match different levels of the outlet section 101, where the calibrated boxes 131 are made to pass as being connected to the transferring line 130, which is used each time.

The possibility to change the distance between the collecting magazines 102 allows rapid and simple adjustment in accordance with the different distances between the calibrated boxes 131 made in the transferring line 130.

Consequently, the proposed apparatus 200 ensures high reliability and production rate in any operation conditions, and can be connected in an extremely rapid and intuitive way to the outlet section of any packaging machine.

The extreme constructive simplicity and the particular compactness of the proposed apparatus ensures particularly simple and easy installation and maintenance thereof.

What is claimed is:

1. An apparatus for feeding articles to a transferring line, the transferring line feeding a container filling machine, the apparatus comprising:

means for conveying a plurality of articles to an inlet section of said apparatus;

a plurality of working means, set, with an initial configuration with predetermined mutual distances, at said inlet section for receiving said articles from said conveying means, and operated after receiving said articles, to move vertically from said inlet section to an outlet section of said apparatus where said articles are released and then to move back to said inlet section;

a plurality of collecting magazines situated at said outlet section for receiving said articles and for supporting said articles to define corresponding piles of articles;

guide means cooperating with said plurality of working means for changing said predetermined mutual distances between said plurality of working means during the transition from said inlet section to said outlet section, the distances between said plurality of working means being set to match distances between said collecting magazines, and for re-setting said plurality of working means to said initial configuration during a transition back to said inlet section;

pushing means situated at said outlet section and operated when said piles, situated inside each of said collecting magazines, are completed to convey said piles of articles to boxes on a transferring line;

each of said collecting magazines having stationary lateral walls and elastic means, situated at an open bottom of said collecting magazines for yieldingly allowing passage of said articles, carried by said working means, so as to define said piles of articles inside said collecting magazine, said elastic means supporting said piles between said lateral walls.

2. The apparatus of claim 1 wherein said working means including at least one transversal plate, operated upon receiving the articles from said conveying means, to reciprocate between said inlet section and said outlet section, said transversal plate supporting slidingly a plurality of longitudinal plates for receiving said articles.

3. The apparatus of claim 2 wherein said guide means, which cooperate with said working means, include a plurality of linear cam grooves, each of which interacts with a corresponding longitudinal plate.

4. The apparatus according to claim 1, wherein said working means include gripping means, connected to each longitudinal plate, and operated during the movement of said transversal plate to stabilize the articles carried by said longitudinal plates.

5. The apparatus according to claim 1, wherein the distance between said collecting magazines is changeable, the distance being substantially equal to the corresponding distance between said boxes on said transferring line.

6. The apparatus according to claim 1, wherein each of said collecting magazines includes lateral walls, having, in a lower part, corresponding horizontal folded edges, which lateral walls swing outwardly in step relation with the movement of said longitudinal plates, so as to increase the inlet opening of a corresponding open bottom of said collecting magazines, and to allow the articles carried by said longitudinal plates, to be introduced into said magazine from the bottom, for defining said piles of articles in said collecting magazine, said horizontal folded edges supporting said piles of articles when said lateral walls are parallel to each other.

7. The apparatus according to claim 1, wherein said conveying means include at least one belt conveyor, which moves a plurality of articles to said inlet section, to feed said longitudinal plates at said inlet section.

8. The apparatus according to claim 7, wherein said belt conveyor is an endless belt conveyor and is mounted on relative driving and driven wheels.

9. The apparatus according to claim 1, wherein said conveying means include a plurality of conveying belts, arranged side by side, each of which feeds articles to a corresponding longitudinal plate at said inlet section.

10. The apparatus according to claim 1, wherein said inlet section is situated at a lower level with respect to said outlet section.

11. The apparatus according to claim 1, wherein said transferring line is arranged angularly with respect to said conveying means.

12. The apparatus according to claim 11, wherein said transferring line is arranged longitudinally or crosswise with respect to said conveying means.

13. The apparatus according to claim 1, wherein said articles are tablets, pills, capsules, or strip packages.

14. An apparatus for feeding articles to a transferring line, the transferring line feeding a container filling machine, the apparatus comprising:

means for conveying a plurality of articles to an inlet section of said apparatus;

a plurality of working means, set with an initial configuration with predetermined mutual distances, at said inlet section for receiving said articles from said conveying means, and operated after receiving said articles, to move vertically from said inlet section to an outlet section of said apparatus where said articles are released and then to move back to said inlet section;

a plurality of collecting magazines situated at said outlet section for receiving said articles and for supporting said articles to define corresponding piles of articles;

guide means cooperating with said plurality of working means for changing said predetermined mutual distances between said plurality of working means during the transition from said inlet section to said outlet section, the distances between said plurality of working means being set to match distances between said collecting magazines, and for re-setting said plurality of working means to said initial configuration during a transition back to said inlet section;

pushing means situated at said outlet section and operated when said piles, situated inside each of said collecting magazines, are completed to convey said piles of articles to boxes on a transferring line;

said working means including at least one transversal plate, operated upon receiving the articles from said conveying means, to reciprocate between said inlet section and said outlet section, said transversal plate supporting slidingly a plurality of longitudinal plates for receiving said articles;

said guide means, which cooperate with said working means, including a plurality of linear cam grooves, each of which interacts wit a corresponding longitudinal plate.

15. The apparatus according to claim 14, wherein said working means include gripping means connected to each longitudinal plate end operated during the movement of said transversal plate to stabilize the articles carried by said longitudinal plates.

16. The apparatus according to claim 14, wherein the distance between said collecting magazines is changeable, the distance being substantially equal to the corresponding distance between said boxes on said transferring line.

17. The apparatus according to claim 14, wherein each of said collecting magazines includes lateral walls, having, in a lower part, corresponding horizontal folded edges, which lateral walls swing outwardly in step relation with the movement of said longitudinal plates, so as to increase the inlet opening of a corresponding open bottom of said collecting magazines, and to allow the articles carried by said longitudinal plates, to be introduced into said magazine from the bottom, for defining said piles of articles in said collecting magazine, said horizontal folded edges supporting said piles of articles when said lateral walls are parallel to each other.

18. The apparatus according to claim 14, wherein each of said collecting magazines includes stationary lateral walls and elastic means, situated at an open bottom of said collecting magazines for yieldingly allowing passage of said articles, carried by said longitudinal plates, so as to define said piles of articles inside said collecting magazine, said elastic means supporting said piles between said lateral walls.

19. The apparatus according to claim 14, wherein said conveying means include at least one belt conveyor, which moves a plurality of articles to said inlet section, to feed said longitudinal plates at said inlet section.

20. The apparatus according to claim 19, wherein said belt conveyor is an endless belt conveyor and is mounted on relative driving and driven wheels.

21. The apparatus according to claim 14, wherein said conveying means include a plurality of conveying belts, arranged side by side, each of which feeds articles to a corresponding longitudinal plate at said inlet section.

22. The apparatus according to claim 14, wherein said inlet section is situated at a lower level with respect to said outlet section.

23. The apparatus according to claim 14, wherein said transferring line is arranged angularly with respect to said conveying means.

24. The apparatus according to claim 23, wherein said transferring line is arranged longitudinally or crosswise with respect to said conveying means.

25. The apparatus according to claim 14, wherein said articles are tablets, pills, capsules, or strip packages.

* * * * *